Oct. 18, 1960    F. KÖBERLE-ZIMMERMANN    2,956,599
END-THRUST TYPE PROFILING CUTTER
Filed March 24, 1958    2 Sheets-Sheet 1
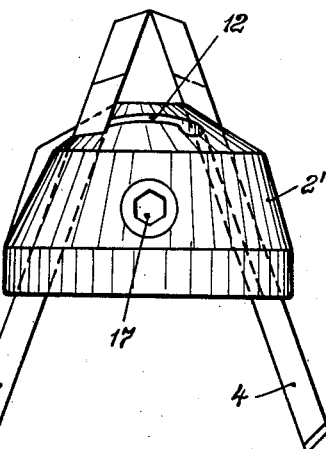
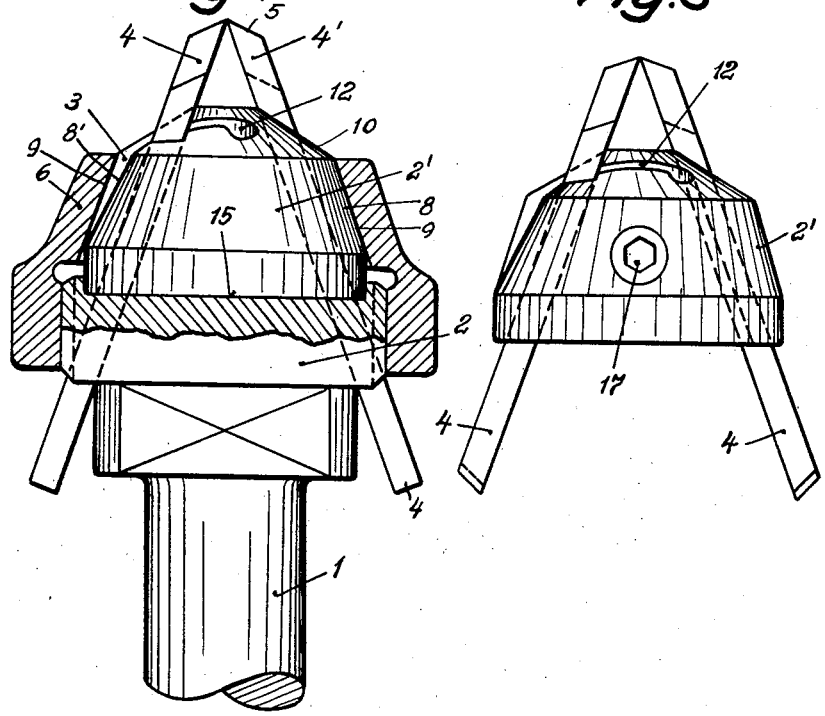
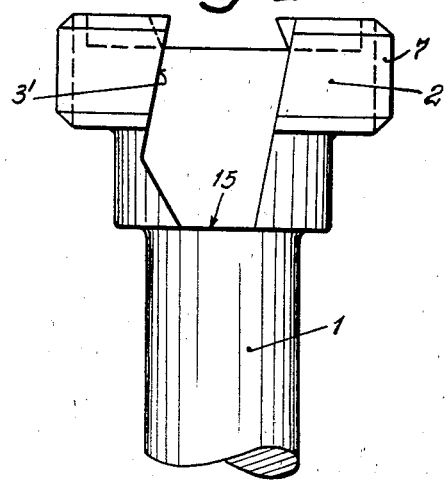
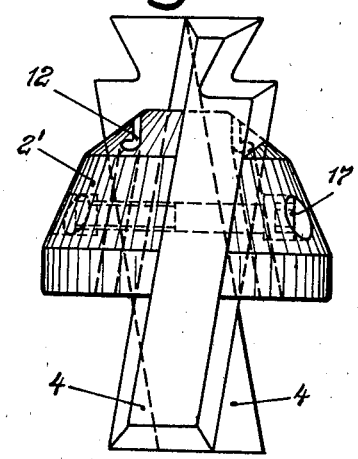

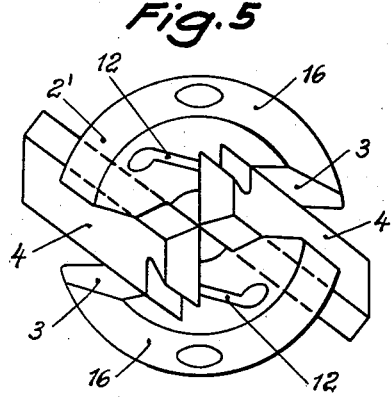
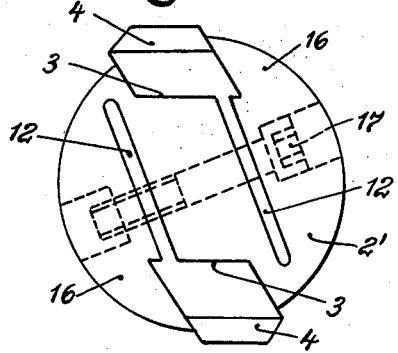
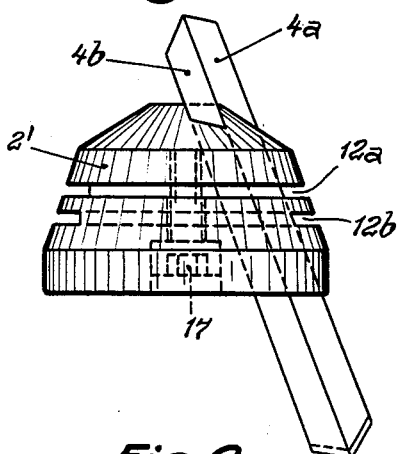
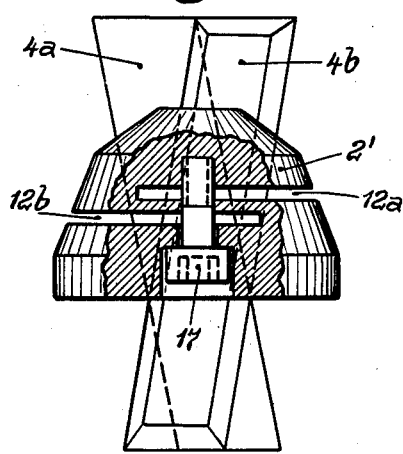
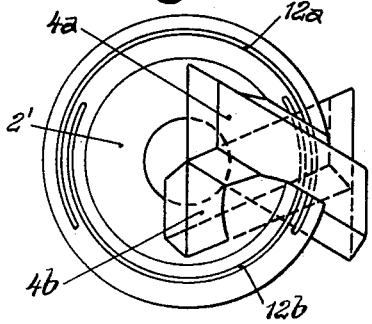
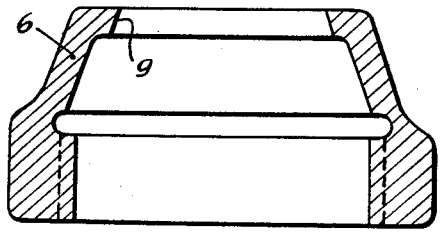

United States Patent Office 2,956,599
Patented Oct. 18, 1960

2,956,599

END-THRUST TYPE PROFILING CUTTER

Fritz Köberle-Zimmermann, Regensdorf, Switzerland

Filed Mar. 24, 1958, Ser. No. 723,565

Claims priority, application Switzerland Sept. 28, 1957

7 Claims. (Cl. 144—219)

For profiling and basic cutter work as well as for executing decorative grooves use is made of single and double-toothed profiled routing cutters.

In the double toothed profiled routing cutters the diameter is always getting smaller with grinding and sharpening. This reduction in diameter may be compensated when using single-toothed shank routing cutters in eccentric chucks, in that the reduction in dimension occurring when grinding such eccentrically working tools may be compensated by adjustment in the eccentric chuck. On the other hand, in the case of single-toothed shank routing cutters, the provision of a cutting angle best suitable for a good basic cut is not possible as with the double-toothed profiled routing tool, so that an untidy cut will result requiring a time-wasting touching up.

Now the present invention relates to a cutter head, especially for use in wood working, by which the deficiences of reducing the diameter of the profile when regrinding, as well as the production of untidy surfaces and edges on the work are obviated.

For this purpose, the cutter head according to the invention, comprises two knives which are adjustable and fixable in clamping guides so as to be held in the direction parallel to the flat sides of the knives, convergent towards the cutting edges and, in the direction towards the flat sides, divergent to each other in such a way that, when readjusting the knives, their cutting edges will be adjustable both with respect to the centre of the head as well as with respect to the desired diameter of the cutting profile.

The two knives of the cutter head may be ground exactly identical, or one tool may be ground as profile knife and the other either as basic knife or as side knife so that, when executing basic routing work such as decorative grooves, optimum cutting angles or neat surfaces and edges on the work will be obtained.

The discrepancies arising when regrinding or sharpening may always be compensated by adjustment of the tools.

By setting the knives forward or back, the profile diameter, that is the width of a decorative groove, may be increased or diminished within certain limits.

If the cutter head according to the invention shall work with one knife only, the other knife may be left mounted, but has to be set back by some tenths of a millimeter in relation to the operating knife.

Moreover, round relief-ground tools may also be used in the head, which are reground on the face like cutters. In this case, the knives as reground on the face may simply be advanced by an amount equal to the difference produced by regrinding, until the suitable diameter is obtained, or until the cutting edges meet again in the axial middle plane.

As knives, also straight blanks may be used for self-profiling. These are ground down from the free end thereof and must also be re-adjusted from time to time by an amount equal to the difference caused by the re-grinding.

Alternatively, instead of steel knives, tungsten carbide tools may be adopted.

The accompanying drawing shows by way of example some preferred forms of embodiment incorporating the invention.

Fig. 1 is a view of the cutter head of a first form, seen parallel to the flat sides of the knives, with a cap nut in cross-section;

Fig. 2 shows the shank of the cutter head with the fixed head part;

Fig. 3 shows the changeable part of the cutter head with clamped knives;

Fig. 4 is side view of Fig. 3, turned 90°;

Fig. 5 is a top end view of Fig. 3;

Fig. 6 shows the changeable part of the cutter head with clamped knives, seen from below and behind;

Fig. 7 is a view of the changeable part of the cutter head with knives, according to a fourth form;

Fig. 8 is a side view of Fig. 7;

Fig. 9 is a top end view of Fig. 7, and

Fig. 10 shows a sectional view of the pertinent cap nut.

Referring to the annexed drawing, the cutter head 2 fitted with a shank 1, has two diametrically opposite dove-tail guiding grooves 3 cut therein for the tools 4 which are provided with a suitable sectional cutting-edge profile 5. The guide grooves 3, and the tools guided therein, are so disposed with respect to each other that, seen in the direction parallel to the flat sides of the knives, they are convergent towards the cutting edges 5 (cf. Figs. 1 and 5) and divergent in the direction at right angles thereto. A cap nut 6 serves for fixing the tools and is screwable onto cutter head 2. The fore-part of the cutter head forms a cone 8 on which rests the cap nut 6 with a corresponding inner cone 9. The flanks 10 of the dovetail guides 3, contacting the periphery of the cone 8 nearly at a tangent, are weakened by recesses 12 so as to acquire a certain resiliency. The other parts of flanks, however, are rigid and are ground back to a face 8' deviating from the cone surface 8 so that they do not contact the clamping surface 9 of the cap nut 6. In this way, by tightening the cap nut, the resilient flank parts of the dovetail guides are pressed towards the tool 4 under action of the clamping surface 8 and thus the knife is set. In the form according to Figs. 1 and 3, the cutting edges 5 have exactly the same profile. The knives serve as profilers and operate uniformly with their entire cutting edge. On the side of its cutting edge contacting the centre, one knife is provided with a slanting ground surface 4' to prevent the tools striking each other with their cutting edges when advanced towards the centre, and thus to provide a certain clearance for the removal of shavings.

By setting one knife back by some tenths of a millimeter relative to the other, it is also possible to work with one knife only. In this case, by advancing or setting back the knife intended for the operation, any desired enlargement or reduction of the diameter of the cutting profile is feasible.

In the third form of embodiment according to Figs. 2–6, the cutter head comprises the two parts 2 and 2' together with the cap nut 6. The fixed part 2 of the head with the screw-thread 7 for the cap nut 6 has a countersunk seat 15 for the exchangeable part 2' of the head, in which the same is supported with some clearance to enable centering through the inner cone 9 of the cap nut. The exchangeable part 2' of the head is provided with guide grooves 3 for taking the knives 4, which grooves extend in such a way that the tools, as seen in the direction parallel to their flat sides, are convergent towards their cutting edges and, as seen in the direction towards the flat sides, are divergent towards their cutting edges. Recesses 12 in the part 2' of the cutter head enable resiliency to be obtained of the clamping surfaces forming the flanks of the guide grooves 3, said recesses constituting resilient clamping jaws 16, the springing path of which extends at right angles to the recesses 12. A clamping screw 17, which passes through the cutter head across the recesses 12, serves for fixing the tools 4, said screw resting with its head on one clamping jaw and engages a correspondingly threaded bore in the other clamping jaw. Reference numerals 3' designate guide grooves which are cut in the fixed part 2 of the cutter head and form extensions of the guide grooves 3 of the changeable part 2' thereof, thus permitting engagement of the knives 4 when placing the part 2' onto part 2. This embodiment of the cutter head has the advantage over the first embodiment that a pair of knives, together with their carrier 2' designed as a clamping device, may be exchanged, without altering the knife setting, for a similar carrier with knives that are differently set or have a different cutting profile. Thus, when changes are frequent because of different profiling work, the time-wasting setting is done away with. Upon tightening the cap nut 6 the cutter head part 2' will be centered by the tapered clamping face 9 and simultaneously subjected to clamping pressure. Because of this pressure exerted by the cap nut, the clamping screw will be wholly or partly relieved, according as to whether the cap nut is tightened to a greater or less extent.

The head part 2' serving as a tool carrier according to another form of embodiment, serves as a profile or basic knife, and the other as a side knife. According to Figs. 7–10, the profile or basic knife is designated 4a and the side knife 4b. Here, in the view parallel to their flat sides, as shown in Fig. 7, the two knives lie in planes parallel to each other so as to cause the side knife to remove the shavings in the direction towards the work, and the profile or basic knife to remove them in a direction away from the work. By this means, neat edges will be produced at the surface of the work. Both knives are inserted into clamping guides 3 of the tool carrier 2'. To produce the clamping action, said carrier is provided with two recesses 12a and 12b directed from opposite sides transversely to the axis of the head part 2', by reason of which recesses the latter is resiliently compressible in the axial direction. By such a compression, the tools will be clamped in their guides 3. A clamping screw 17 arranged axially in said part 2' serves to produce the clamp pressure and rests with its head on the inner end of part 2', entering a threaded bore in the outer end thereof. By tightening the clamping screw 17 the outer head part is drawn towards the inner one, that is to say the head part 2' will be compressed axially. In this form, the cap nut, as shown in Fig. 19, is cut out at its inner cone 9 in such a way that it merely rests with its outer portion on the outer portion of the head part 2', so that its clamping is also made possible by tightening the cap nut. Because of the clamping pressure of the cap nut, the clamping screw 17 may be relieved.

It is understood that this type of clamping the tools by axial compressibility of the carrier may be applied to all forms of cutter heads, in which the knives are fixed obliquely to the tool axis, whereby the tool carrier may be fixed or be designed as an exchangeable part.

What I claim is:

1. A cutter head for a groove cutting tool comprising, in combination, a body member including a cylindrical portion and a frusto-conical portion coaxially arranged with said cylindrical portion and projecting from one end thereof, said frusto-conical portion being formed in the conical surface thereof with a pair of opposite grooves adapted to receive a pair of cutting knives, respectively, each of said grooves being defined by a bottom surface and a pair of substantially parallel side surfaces, the bottom surfaces of said opposite grooves converge towards the free end of said frusto-conical portion, and the side surfaces of said opposite grooves diverge towards said end; a hollow frusto-conical shell member surrounding said frusto-conical portion and being adjustable in axial direction thereof relative to said frusto-conical portion so that a pair of cutting knives located in said grooves may be clamped between said bottom faces thereof and the inner surface of said shell member; and means for removably fastening said shell member to said body member and for adjusting the position of said members relative to each other in axial direction.

2. A cutter head for a groove cutting tool comprising, in combination, a body member including a cylindrical portion and a frusto-conical portion coaxially arranged with said cylindrical portion and projecting from one end thereof, said frusto-conical portion being formed in the conical surface thereof with a pair of opposite grooves adapted to receive a pair of cutting knives, respectively, each of said grooves being defined by a bottom surface and a pair of substantially parallel side surfaces, the bottom surfaces of said opposite grooves converge towards the free end of said frusto-conical portion, and the side surfaces of said opposite grooves diverge towards said end, said frusto-conical portion including a pair of springy wing portions resiliently connected at one end thereof to the remainder of said frusto-conical portion and having respectively free ends forming one of the side faces of said grooves, said wing portions having an outer arcuate surface resiliently movable from an expanded position to a clamped position in which said outer surfaces are located within the outer frusto-conical surface of said frusto-conical portion; a hollow frusto-conical shell member surrounding said frusto-conical portion and engaging said outer surfaces of said wing portions, said frusto-conical shell member being adjustable in axial direction thereof relative to said frusto-conical portion to move said wing portions from said expanded to said clamping position thereof so that a pair of cutting knives located in said grooves may be clamped between said side faces and between said bottom faces and the inner surface of said shell member; and means for removably fastening said shell member to said body member and for adjusting the position of said members relative to each other in axial direction.

3. A groove cutting tool comprising, in combination, a body member including a cylindrical portion, a shank projecting from one end thereof and a frusto-conical portion coaxially arranged with said cylindrical portion and projecting from the other end thereof, said frusto-conical portion being formed in the conical surface thereof with a pair of opposite grooves adapted to receive a pair of cutting knives, respectively, each of said grooves being defined by a bottom surface and a pair of substantially parallel side surfaces, the bottom surfaces of said opposite grooves converge towards the free end of said frusto-conical portion, and the side surfaces of said opposite grooves diverge towards said end; a pair of cutting knives respectively located in said grooves and projecting beyond said frusto-conical portion oppositely to said shank; a hollow frusto-conical shell member surrounding said frusto-conical portion and being adjustable in axial direction thereof relative to said frusto-conical portion so that said pair of cutting knives located in said grooves may be clamped between said bottom faces thereof and the inner surface of said shell member; and means for removably fastening said shell member to said body member and for adjusting the position of said members relative to each other in axial direction.

4. A groove cutting tool, comprising, in combination, a body member including a cylindrical portion, a shank projecting from one end thereof and a frusto-conical portion coaxially arranged with said cylindrical portion and projecting from the other end thereof, said cylindrical portion being formed with a screw thread, said frusto-conical portion being formed in the conical surface thereof with a pair of opposite grooves adapted to receive a pair of cutting knives, respectively, each of said grooves being defined by a bottom surface and a pair of substantially parallel side surfaces, the bottom surfaces of said opposite grooves converge towards the free end of said frusto-conical portion, and the side surfaces of said opposite grooves diverge towards said end; a pair of cutting knives respectively located in said grooves and projecting beyond said frusto-conical portion oppositely to said shank; and a hollow frusto-conical shell member surrounding said frusto-conical portion and having a hollow cylindrical extension formed at the inner surface thereof with a screw thread screwed on the screw thread of said cylindrical portion of said body member so as to be adjustable in axial direction thereof relative to said frusto-conical portion so that said pair of cutting knives located in said grooves may be clamped between said bottom faces thereof and the inner surface of said shell member.

5. A groove cutting tool comprising, in combination, a body member including a cylindrical portion, a shank projecting from one end thereof and a frusto-conical portion coaxially arranged with said cylindrical portion and projecting from the other end thereof, said frusto-conical portion being formed in the conical surface thereof with a pair of opposite grooves adapted to receive a pair of cutting knives, respectively, each of said grooves being defined by a bottom surface and a pair of substantially parallel side surfaces, the bottom surfaces of said opposite grooves converge toward the free end of said frusto-conical portion, and the side surfaces of said opposite grooves diverge towards said end, said frusto-conical portion including a pair of springy wing portions resiliently connected at one end thereof to the remainder of the said frusto-conical portion and having respectively free ends forming one of the side faces of said grooves, said wing portions having an outer arcuate surface resiliently movable from an expanded position to a clamped position in which said outer surfaces are located within the outer frusto-conical surface of said frusto-conical portion; a pair of cutting knives respectively located in said grooves and projecting beyond said frusto-conical portion oppositely to said shank; a pair of means operatively connected to said wing portions, respectively, for moving said wing portions from said expanded to said clamped position thereof so that said knives located in said grooves may be individually adjusted and properly clamped; a hollow frusto-conical shell member surrounding said frusto-conical portion and being adjustable in axial direction thereof relative to said frusto-conical portion; and means for fastening said shell member to said body member and for adjusting the position of said members relative to each other in axial direction.

6. A groove cutting tool comprising, in combination, a body member including a cylindrical portion, and a shank projecting from one end thereof; a frusto-conical member coaxially arranged on said cylindrical portion and projecting from the other end thereof, said frusto-conical member being formed in the conical surface thereof with a pair of opposite grooves adapted to receive a pair of cutting knives, respectively, each of said grooves being defined by a bottom surface and a pair of substantially parallel side surfaces, the bottom surfaces of said opposite grooves converge toward the free end of said frusto-conical member, and the side surfaces of said opposite grooves diverge towards said end, said frusto-conical member including a pair of springy wing portions resiliently connected at one end thereof to the remainder of the said frusto-conical member and having respectively free ends forming one of the side faces of said grooves, said wing portions having an outer arcuate surface resiliently movable from an expanded position to a clamped position in which said outer surfaces are located within the outer frusto-conical surface of said frusto-conical member; a pair of cutting knives respectively located in said grooves and projecting beyond said frusto-conical member oppositely to said shank; a pair of means operatively connected to said wing portions, respectively, for moving said wing portions from said expanded to said clamped position thereof so that said knives located in said grooves may be individually adjusted and properly clamped; a hollow frusto-conical shell member surrounding frusto-conical member and being adjustable in axial direction thereof relative to said frusto-conical member; and means for fastening said shell member to said body member for adjusting the position of said members relative to each other in axial direction.

7. A groove cutting tool comprising, in combination, a body member including a cylindrical portion, and a shank projecting from one end thereof, said cylindrical portion being formed with a screw thread; a frusto-conical member coaxially arranged on said cylindrical portion and projecting from the other end thereof, said frusto-conical member being formed in the conical surface thereof with a pair of opposite grooves adapted to receive a pair of cutting knives, respectively, each of said grooves being defined by a bottom surface and a pair of substantially parallel side surfaces, the bottom surfaces of said opposite grooves converge toward the free end of said frusto-conical member, and the side surfaces of said opposite grooves diverge towards said end, said frusto-conical member including a pair of springy wing portions resiliently connected at one end thereof to the remainder of the said frusto-conical member and having respectively free ends forming one of the side faces of said grooves, said wing portions having an outer arcuate surface resiliently movable from an expanded position to a clamped position in which said outer surfaces are located within the outer frusto-conical surface of said frusto-conical member; a pair of cutting knives respectively located in said grooves and projecting beyond said frusto-conical member oppositely to said shank; a pair of means operatively connected to said wing portions, respectively, for moving said wing portions from said expanded to said clamped position thereof so that said knives located in said grooves may be individually adjusted and properly clamped; and a hollow frusto-conical shell member surrounding said frusto-conical member, said shell member having a hollow cylindrical extension formed at the inner surface thereof with a screw thread screwed on the screw thread of said cylindrical portion of said body member so as to be adjustable in axial direction thereof relative to said frusto-conical member.

References Cited in the file of this patent

UNITED STATES PATENTS

| 103,890 | Jordan | June 7, 1870 |
| 209,012 | Bwinshaw | Oct. 15, 1878 |
| 914,966 | Mayer et al. | Mar. 9, 1909 |
| 2,675,036 | Nelsen | Apr. 13, 1954 |

FOREIGN PATENTS

| 59,708 | Switzerland | Mar. 22, 1912 |
| 255,497 | Switzerland | Jan. 17, 1949 |
| 258,918 | Switzerland | May 16, 1949 |